United States Patent
Shima et al.

(10) Patent No.: US 7,870,298 B2
(45) Date of Patent: Jan. 11, 2011

(54) INFORMATION PROCESSING APPARATUS, INFORMATION PROCESSING SYSTEM, ROUTING APPARATUS AND COMMUNICATION CONTROL METHOD

(75) Inventors: Koji Shima, Kanagawa (JP); Kazushige Machiyama, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 870 days.

(21) Appl. No.: 11/580,261

(22) Filed: Oct. 12, 2006

(65) Prior Publication Data
US 2007/0088829 A1 Apr. 19, 2007

(30) Foreign Application Priority Data
Oct. 14, 2005 (JP) .............................. 2005-299732

(51) Int. Cl.
G06F 15/16 (2006.01)
G06F 15/167 (2006.01)
G06F 15/173 (2006.01)
G06F 9/46 (2006.01)
G06F 13/36 (2006.01)
G06F 13/28 (2006.01)
H04L 12/28 (2006.01)

(52) U.S. Cl. .................... 709/250; 709/212; 709/223; 709/224; 709/225; 709/226; 709/249; 370/389; 370/392; 370/412; 718/1; 718/104; 718/105; 710/22; 710/308

(58) Field of Classification Search ................ 709/212, 709/223–226, 249, 250; 370/389, 392, 412; 718/104, 105
See application file for complete search history.

(56) References Cited

U.S. PATENT DOCUMENTS

| | | | | |
|---|---|---|---|---|
| 5,784,558 | A * | 7/1998 | Emerson et al. | 709/230 |
| 6,330,616 | B1 * | 12/2001 | Gioquindo et al. | 709/236 |
| 6,778,540 | B1 * | 8/2004 | Ratcliff et al. | 370/401 |
| 7,356,608 | B2 * | 4/2008 | Rimmer | 709/238 |
| 7,415,034 | B2 * | 8/2008 | Muller et al. | 370/463 |
| 2003/0189936 | A1 * | 10/2003 | Terrell et al. | 370/395.31 |
| 2003/0236852 | A1 * | 12/2003 | Fernandes et al. | 709/215 |
| 2004/0255047 | A1 * | 12/2004 | Larson et al. | 709/249 |
| 2005/0018669 | A1 * | 1/2005 | Arndt et al. | 370/389 |
| 2005/0129040 | A1 * | 6/2005 | Kiel et al. | 370/412 |
| 2005/0144313 | A1 * | 6/2005 | Arndt et al. | 709/238 |
| 2005/0204366 | A1 * | 9/2005 | Billau et al. | 719/324 |
| 2005/0265248 | A1 * | 12/2005 | Gallatin et al. | 370/250 |

* cited by examiner

Primary Examiner—Jeffrey F Harold
Assistant Examiner—Kai J Chang
(74) Attorney, Agent, or Firm—Frommer Lawrence & Haug LLP; William S. Frommer; Paul A. Levy

(57) ABSTRACT

Two logical partitions within a single computer communicate with each other internally. The protocol stack of a first logical partition generates a frame in a memory space provided in a driver and referred to by the first logical partition. The driver transfers the frame generated in the memory space of the first logical partition to a communication port of a Layer 2 switch using DMA. The communication port of the Layer 2 switch loops back the frame input from the driver. An interrupt is signaled to the driver and the frame is transferred from communication port of the Layer 2 switch to the driver using DMA. The frame is received in a memory space referred to by a second logical partition.

10 Claims, 8 Drawing Sheets

FIG.7

| PORT | MAC ADDRESS | LOOPBACK |
|---|---|---|
| A | MAC1, MAC2, MAC3 | ON |
| B | MAC4 | OFF |
| C | MAC5 | OFF |

220

INFORMATION PROCESSING APPARATUS, INFORMATION PROCESSING SYSTEM, ROUTING APPARATUS AND COMMUNICATION CONTROL METHOD

BACKGROUND OF THE INVENTION

1. Field of the Invention

The present invention relates to an information processing apparatus, an information processing system, a routing apparatus and a communication control method.

2. Description of the Related Art

A technology is known in which computing resources in a single computer system including a CPU, memory, I/O device, etc. are divided into multiple logical partitions in which operating systems are run independently. In a computing system provided with logical partitions, a basic program called a hypervisor for controlling logical partitions is usually run. A hypervisor assigns computing resources to the logical partitions so that each logical partition operates as a single virtual computer.

The technology for logical partitioning is used for purposes including implementing a multi-operating system in which multiple different operating systems are run in a single computer and running applications in parallel by viewing a single computer as virtual parallel computers.

In order to exchange data between logical partitions in a system provided with multiple logical partitions, a dedicated function for communication between logical partitions should be originally designed and implemented. Significant cost will be incurred in developing such a function. Since the above-mentioned approach will necessitate developing basic software (such as an operating system and a driver) and applications for parallel processing, using the dedicated communication function thus designed. This will increase burden on software developers.

For exchange of data between logical partitions, it is necessary to copy data from a memory space referred to by a logical partition to a memory space referred to by another logical partition. Therefore, there is a problem in that significant overhead is incurred due to the copying.

SUMMARY OF THE INVENTION

Accordingly, a general purpose of the present invention is to provide a technology for communication between logical partitions capable of efficiently exchanging data between multiple logical partitions.

An information processing apparatus according to at least one embodiment of the present invention, provided with a plurality of logical partitions assigned logically divided computing resources, and configured such that operating systems are independently run in the respective logical partitions, comprises: a network driver which receives a request for communication from the logical partitions assigned respective physical addresses and controls transmission and reception of data. The network driver transmits a frame received from one logical partition to a routing apparatus without referring to a destination address and delivers a frame received from the routing apparatus in loopback mode to another logical partition according to a destination address of the frame received from the routing apparatus.

The frame input from the one logical partition to the network driver may be data to be delivered to the another logical partition or data to be transmitted to an external device other than the information processing apparatus. The network driver transmits the data to the routing apparatus without making any distinction between two types of data. According to the embodiment, if the frame input from the one logical partition to the network driver is data to be delivered to the another logical partition, the network driver is capable of delivering the data to the another logical partition by receiving the data looped back from the routing apparatus as a received frame. If the frame input from the one logical partition to the network driver is data to be transmitted to an external device other than the information processing apparatus, the network driver is capable of transmitting the data to the external device via the routing apparatus.

An information processing system according to at least one embodiment of the present invention includes an information processing apparatus which is with a plurality of logical partitions assigned logically divided computing resources, and which is configured such that operating systems are independently run in the respective logical partitions, and also includes a routing apparatus which is connected to the information processing apparatus. The information processing apparatus comprises: a network driver which receives a request for communication from the logical partitions assigned respective physical addresses and controls transmission and reception of data. The routing apparatus includes a port controller which loops back a frame, input from the information processing apparatus to a communication port, to the information processing apparatus. The network driver transmits a frame received from one logical partition to the routing apparatus without referring to a destination address and delivers a frame received from the routing apparatus in loopback mode to another logical partition according to a destination address of the frame received from the routing apparatus.

A routing apparatus according to at least one embodiment of the present invention, having a communication port connected to an information processing apparatus, comprises: a table which stores a physical address to loop back to, in association with the communication port; and a port controller which, when a destination address of a frame input from the information processing apparatus to the communication port matches the physical address to loop back to, loops back the input frame to the information processing apparatus.

A method according to at least one embodiment of the present invention, for controlling communication between logical partitions assigned logically divided computing resources and are assigned respective physical addresses, comprises: transferring a frame, received from the one logical partition, from a memory space referred to by the one logical partition to a routing apparatus without referring to a destination address; and transferring a frame looped back from the routing apparatus to a memory space referred to by the another logical partition in accordance with a destination address of the frame received from the routing apparatus.

Optional combinations of the aforementioned constituting elements, and implementations of the invention in the form of methods, apparatuses, systems computer programs, data structures, recording mediums, etc. may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7 shows an example of a MAC address table of FIG. 6; and

DETAILED DESCRIPTION OF THE INVENTION

The invention will now be described by reference to the preferred embodiments. This does not intend to limit the scope of the present invention, but to exemplify the invention.

Figure 1:
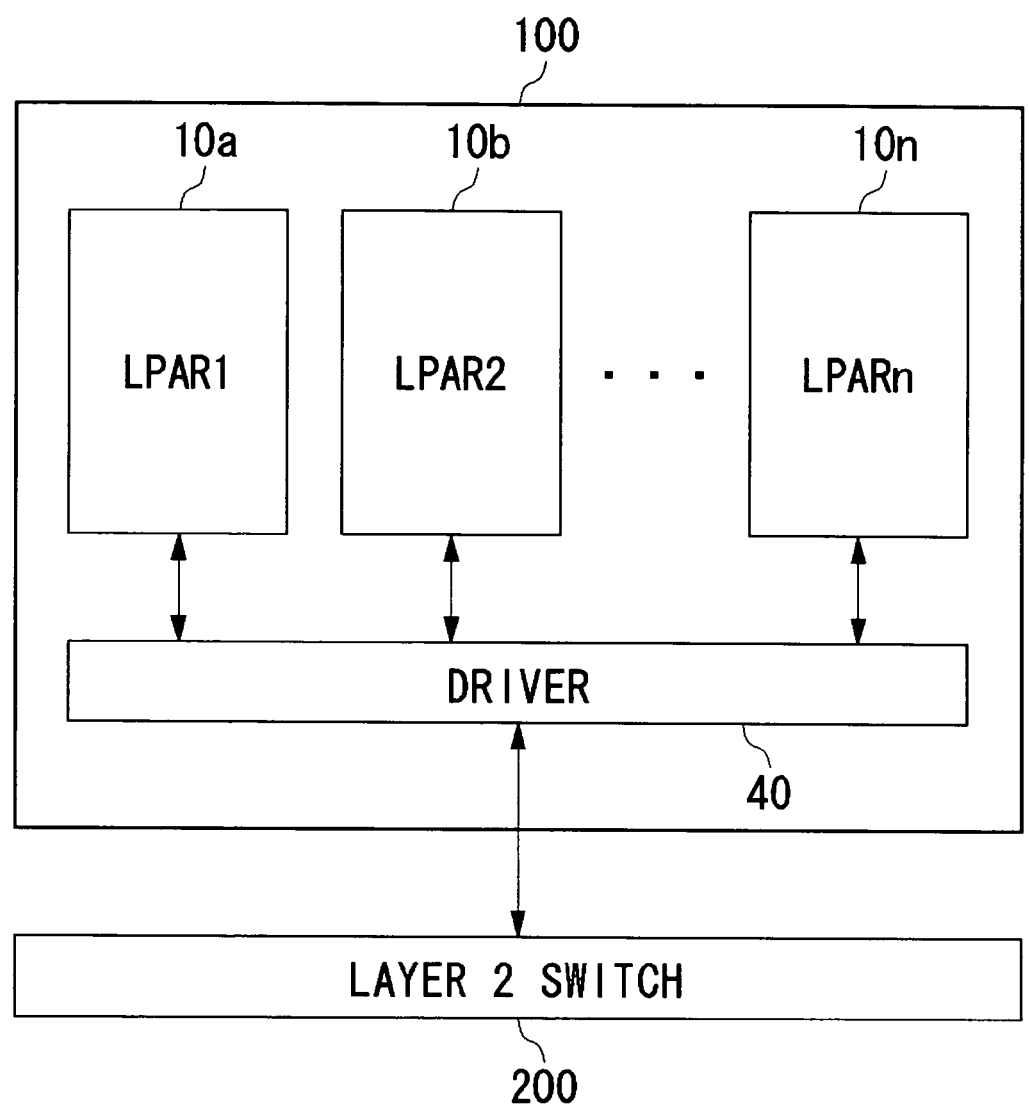
FIG. 1 shows the structure of an information processing system according to an embodiment of the present invention.

FIG. 1 shows the structure of an information processing system according to an embodiment of the present invention. The information processing system includes an information processing apparatus 100 and a Layer 2 switch connected to the information processing apparatus 100.

The information processing apparatus 100 is a computer provided with computing resources such as a processor, a memory, an I/O device, etc. The information processing apparatus 100 is divided into multiple logical partitions (hereinafter, referred to as LPARs) 10a, 10b, . . . 10n. Computing resources are assigned to LPARs 10a-10n. Operating systems are independently run on the LPARs using the computing resources assigned.

LPARs 10a-10n are individually assigned address information that uniquely identify them. For example, LPARs 10a-10n are assigned Media Access Control (MAC) addresses and Internet Protocol (IP) addresses, which are necessary for communication over a network.

LPAR 10a-10n each has a network protocol stack and generates a frame designating a MAC address or an IP address as a destination address according to the network protocol, delivering the frame to a network driver (hereinafter, simply referred to as a "driver") 40.

Procedures such as Address Resolution Protocol (ARP), which is used to determine a MAC address (physical address of Ethernet) from an IP address, will be omitted from the description. The following description simply assumes that Ethernet frames destined to MAC addresses are generated by the network protocol stack.

The driver 40 arbitrates requests for communication from LPAR 10a-10n and transfers frames delivered from LPAR 10a-10n to the Layer 2 switch 200 using Direct Memory Access (DMA). The Layer 2 switch 200 transfers the frame input from the driver 40 to the destination address. The driver 40 also accepts an interrupt from the Layer 2 switch 200 so as to receive a frame destined to LPAR 10a-10n from the Layer 2 switch using DMA. The driver 40 delivers the received frame to the network protocol stack of the destination LPAR.

The driver 40 is provided in a basic system called a hypervisor for exercising control of assigning computing resources to LPAR 10a-10n. The driver 40 may operate on a continuous basis or the driver 40 may be assigned computing resources as an LPAR. In the latter case, the driver 40 represents a process which is run in a time shared mode, like the operating systems in LPAR 10a-10n.

The Layer 2 switch is described by way of an example of routing apparatus. The Layer 2 switch 200 determines the destination address of a frame (a unit of data transmission and reception) on the data link layer (the second layer in the OSI reference model) and transfers the frame accordingly. Media Access Control (MAC) is known as a protocol on the data link layer. A routing apparatus that determines the destination address of a frame by referring to a MAC address is generally called a switching hub. A switching hub operates as a bridge which analyzes the header of a frame input from a terminal at a communication port so as to detect a destination address. A switching hub transfers the frame to a communication port connected to a destination terminal and outputs the frame from the communication port to which the frame is transferred. A switching hub is provided with a buffer for temporarily storing a frame input for analysis of a destination address.

A Layer 2 switch 200 is connected to multiple information processing apparatuses, which can communicate with each other via the Layer 2 switch 200. The information processing apparatuses connected to the Layer 2 switch may be divided into logical partitions or may be an ordinary computer which is not divided into logical partitions. The Layer 2 switch 200 is in cascade connection with other Layer 2 switches and so is capable of routing between the switch and information processing apparatuses connected to the other Layer 2 switch.

In the information processing system according to the embodiment, the Layer 2 switch 200 not only handles data exchange between LPAR 10a-10n within the information processing apparatus 100 and other information processing apparatuses, but also handles internal data exchange between LPAR 10a-10n within the information processing apparatus 100. For this purpose, the Layer 2 switch 200 is provided with a loopback function that coexists with the ordinary switching function.

For comparison, a description will be given of a method for communication between LPAR 10a-10n within the information processing apparatus 100 without using the Layer 2 switch 200. Internal communication between LPAR 10a and LPAR 10b (hereinafter, referred to as LPAR1 and LPAR2) will be described.

The protocol stack of LPAR1 (hereinafter, simply referred to as "protocol stack") 20a of LPAR 1 generates a frame 52a in a memory space referred to by LPAR1 and provided in the network driver 40. The driver 40 copies the frame 52a to a memory space 50b that can be referred to by LPAR2 in order to deliver the frame 52a generated by LPAR1 to the protocol stack 20b of LPAR2. The copied frame is indicated by reference numeral 54b.

The protocol stack 20b of LPAR2 notified by the driver 40 reads the copied frame 54b from the memory space 50b that can be referred to by LPAR2 and processes the frame 54b according to the protocol.

As described, data exchange between LPAR1 and LPAR2 requires that the driver 40 perform memory-to-memory copy from the memory space 50a referred to by source LPAR1 to the memory space 50b referred to by destination LPAR2. Significant overhead is incurred due to the copying process.

It is also necessary for source LPAR1 to communicate with an external device other than the information processing apparatus 100. Therefore, the driver 40 examines the MAC address of the frame generated by the protocol stack 20a of LPAR1 so as to determine whether it the frame is destined to another LPAR within the information processing apparatus 100 or to an external device other than the information processing apparatus 100. The driver 40 refers to the result of determination of the destination MAC address so as to perform memory-to-memory copy if the frame is destined to another LPAR within the information processing apparatus 100. If the frame is destined to an external device, the driver 40 transfers the frame to Layer 2 switch 200 using DMA.

Thus, the driver 40 is responsible for examining the MAC addresses of the frames received from LPARs within the information processing apparatus 100 exhaustively so as to determine if the frame is for internal communication or for external communication. Processing cost incurred in this way is significant. The processor resources of the information processing apparatus 100 are consumed by this process of determination.

In this background, the approach of this embodiment does not use memory-to-memory copy. Instead, the loopback function of the Layer 2 switch 200 is utilized to transfer a frame from LPAR1 to LPAR2 using DMA.

Figure 2B:
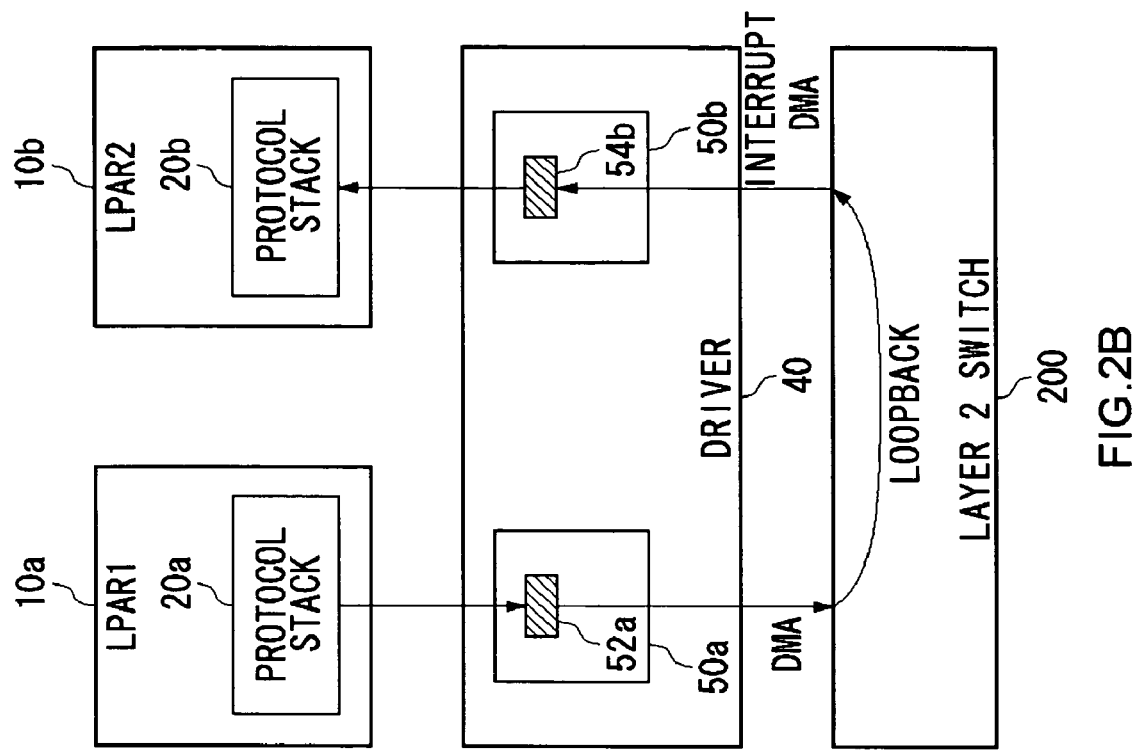
FIG. 2B shows a method whereby the plurality of logical partitions in the information processing apparatus communicate with each other using the loopback function of the Layer 2 switch.
Figure 2A:
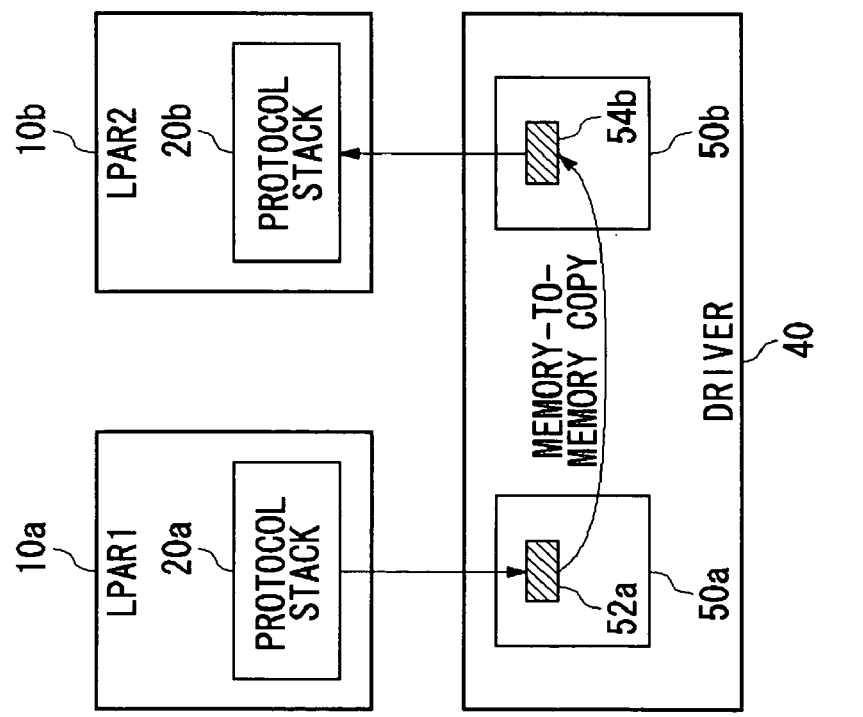
FIG. 2A shows a method of communication between a plurality of logical partitions in an information processing apparatus without using a Layer 2 switch.

FIG. 2B shows a method whereby data is exchanged between LPAR1 and LPAR2 by using the loopback function of the Layer 2 switch 200.

The driver 40 uses DMA to transfer the frame 52*a* generated by the protocol stack 20*a* of LPAR1 in the memory space 50*a* to a communication port of the Layer 2 switch 200 without referring to the MAC address. The communication port of the Layer 2 switch 200 loops back the frame input from the driver 40 to the driver 40. In this process, an interrupt is signaled to the driver 40. The communication port of the Layer 2 switch 200 transfers the frame to the driver 40 using DMA so that the frame 54*b* is received in the memory space 50*b* that can be referred to by LPAR 2.

The Layer 2 switch 200 of this embodiment stores a table listing the MAC addresses of LPAR 10*a*-10*n* within the information processing apparatus 100 as addresses to loop back to. When a frame is input to the communication port connected to the information processing apparatus 100, a determination is made as to whether the destination MAC address of the input frame is an address to loop back to. If it is an address to loop back to, the Layer 2 switch loops back the input frame to the information processing apparatus 100.

Loopback in this case does not mean that all of the input frames are returned in loopback mode. The input frame is returned in loop back mode only when the destination MAC address is a registered address. It should be noted that the term is used in a meaning different from the usual meaning of loopback.

With the use of the loopback function of the Layer 2 switch 200, memory-to-memory copy does not take place. Because the input frame is transferred from the memory space 50*a* of source LPAR1 to the memory space 50*b* of destination LPAR2 by way of a hardware DMA channel, the processor resources of the information processing apparatus 100 are not consumed.

The driver 40 is allowed to transmit all generated frames to the Layer 2 switch 200 without making distinction as to whether the frame is for internal transmission between LPARs within the information processing apparatus 100 or the frame is to be transmitted from an LPAR to an external device other than the information processing apparatus 100. Only when an interrupt is signaled from the Layer 2 switch 200, the driver 400 is expected to receive a frame destined to one of the LPARs within the information processing apparatus 100. Thus, the only task of the driver 40 is to transmit and receive frames to and from the Layer 2 switch 200 without making any distinction between internal communication and external communication. No process for determination of the MAC address of a frame is required in the driver 40.

In order to implement LPAR-to-LPAR communication described with reference to FIG. 2B, the Layer 20 switch 200 of the embodiment is provided with the expanded switching function implemented by adding the loopback function to the ordinary switching function.

Figure 3:
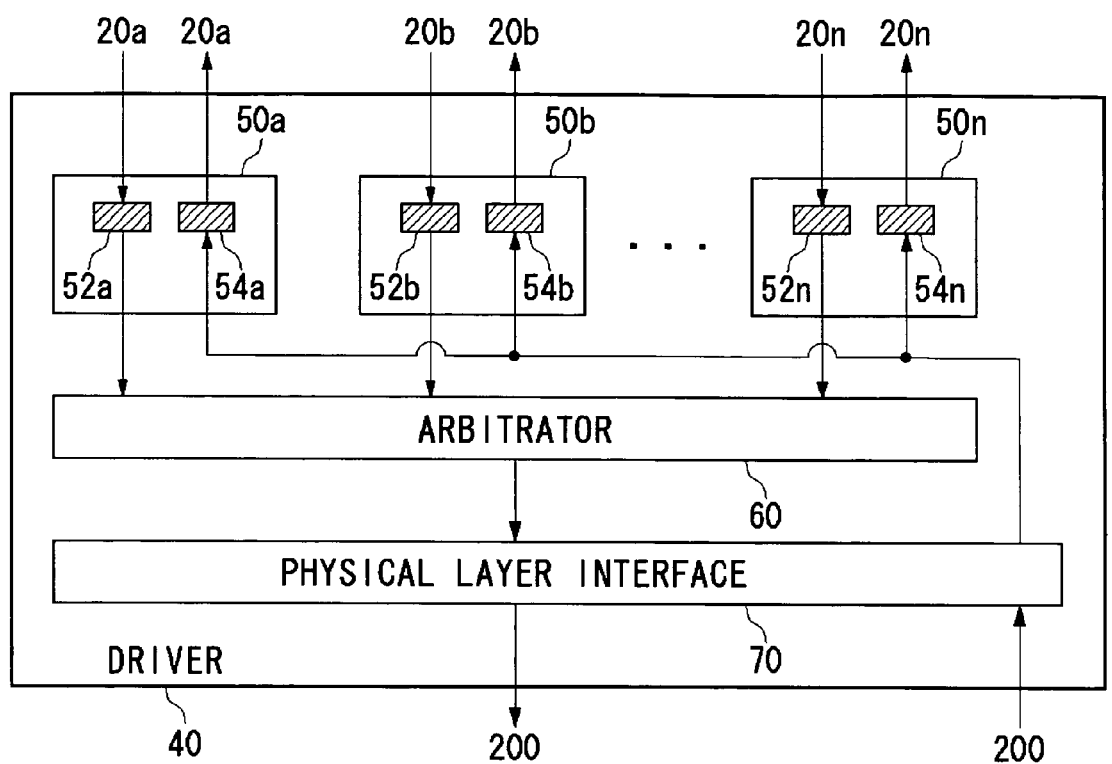
FIG. 3 shows the structure of a driver of FIG. 1.

FIG. 3 shows the structure of the switching driver 40. The driver 40 is provided with the memory spaces 50*a*-50*n* corresponding to LPAR 10*a*-10*n*, respectively. Transmission frames 52*a*-52*n* are generated in the memory spaces 50*a*-50*n* by the protocol stacks 20*a*-20*n* of LPAR 10*a*-10*n*, respectively.

Since there is only one physical communication port between the information processing apparatus 100 and the Layer 2 switch 200, an arbitrator 60 provided in the driver 40 arbitrates requests for communication from LPAR 10*a*-10*n*. More specifically, the arbitrator 60 arbitrates requests for transmitting the frames 52*a*-52*n* generated in the memory spaces 50*a*-50*n*, respectively, so as to provide one of the transmission frames to a physical layer interface 70. For example, the arbitrator 60 provides the transmission frames 52*a*-52*n* in the order of arrival or in the order of priority.

The physical layer interface 70 is an interface for inputting and outputting a frame from and to the communication port of the Layer 2 switch 200. The physical interface 70 transmits a frame provided by the arbitrator 60 to the communication port of the Layer 2 switch 200. Further, the physical layer interface 70 uses DMA to transfer the frame input from the communication port of the Layer 2 switch 200 to the corresponding memory space (one of 50*a*-50*n*) in accordance with the destination MAC address. As a result of DMA transfer for reception, the received frames 54*a*-54*n* are formed in the memory spaces 50*a*-50*n*, respectively, and delivered to the protocol stack 20*a*-20*n* of LPAR 10*a*-10*n*, respectively.

The arbitrator 60 provides all of the input frames to the physical layer interface 70 without making distinction as to whether the frame input from LPAR 10*a*-10*n* is destined to another LPAR within the information processing apparatus 100 or the frame is to be transmitted to an external device other than the information processing apparatus 100, so as to allow the physical layer interface 70 to transmit the frame to the Layer 2 switch 200. In other words, the arbitrator 60 provides the transmission frame to the physical layer interface 70 without examining the destination MAC address of the transmission frame input from LPAR 10*a*-10*n*. When a frame is received from the Layer 2 switch 200, the physical layer interface 70 determines the destination of DMA transfer in accordance with the destination MAC address and uses DMA to directly transfer the received frame to a memory space corresponding to the destination MAC address. Therefore, software-based process for determining the destination MAC address in the driver 40 is not required.

The functional composition of the Layer 2 switch 200 will now be described. First, the switching function of the Layer 2 switch 200 will be described with reference to FIG. 4. Then, a description will be given with reference to FIG. 5 to show that the loopback function is added to the switching function of the Layer 2 switch 200.

Figure 4:
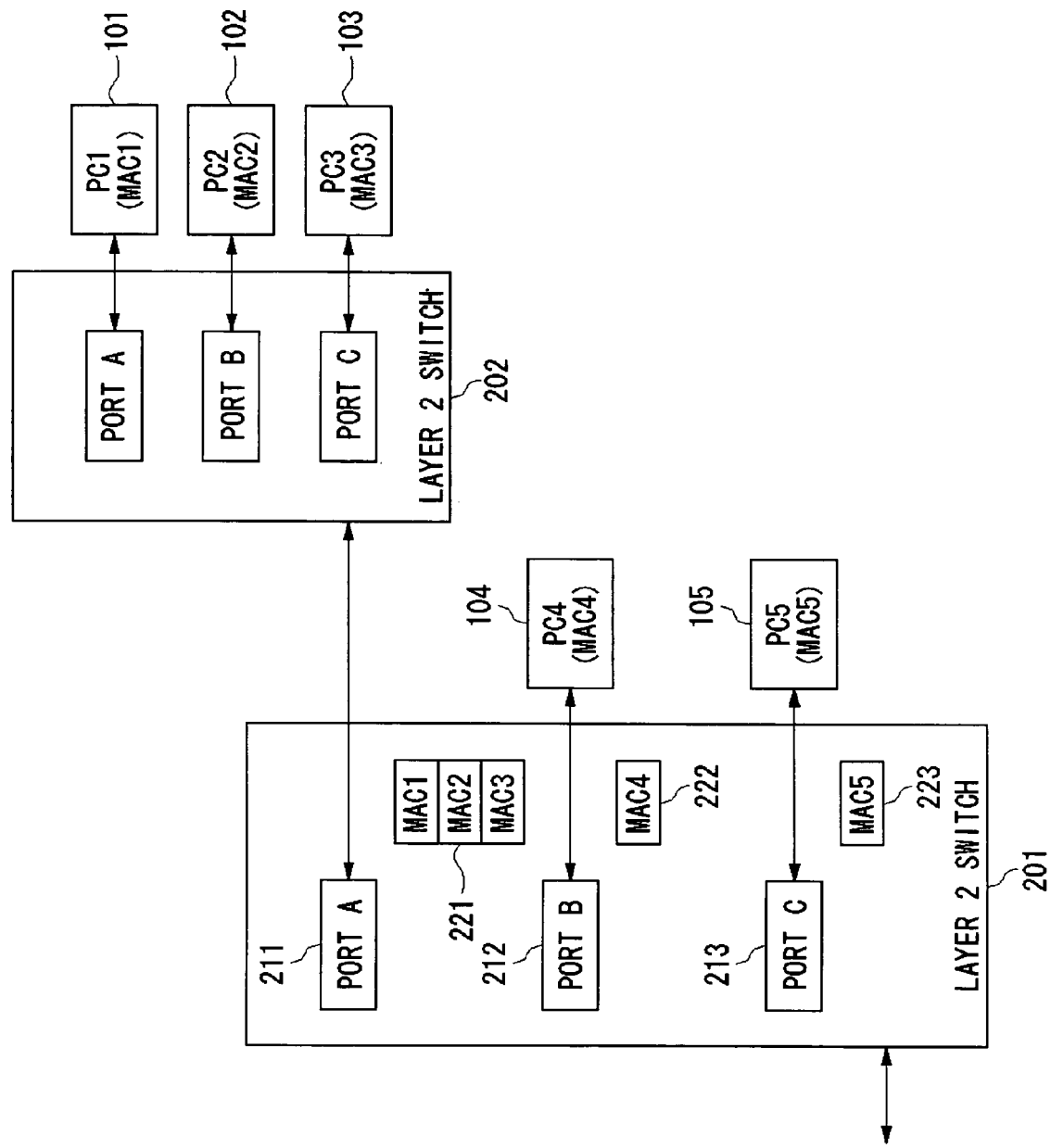
FIG. 4 shows an ordinary structure in which Layer 2 switches are in cascade connection.

FIG. 4 shows an ordinary structure in which Layer 2 switches are in cascade connection. Port A (211) of the first Layer 2 switch 201 is cascade-connected to the second Layer 2 switch 202. Port A, port B and port C of the second switch 202 are connected to computers 101, 102 and 103 (hereinafter, referred to as "PC1", "PC2" and "PC3"), respectively. It will be assumed that the MAC address of PC1, PC2 and PC3 are MAC1, MAC2 and MAC3, respectively.

Port B (212) of the first Layer 2 switch 201 is connected to a computer 104 ("PC4") and port C (213) is connected to a computer 105 ("PC5"). It will be assumed that the MAC address of PC4 and PC5 are MAC4 and MAC5, respectively.

The first Layer 2 switch 201 stores in an MAC address table the MAC addresses of the computers, in association with the ports to which the computers are connected. Port A of the first Layer 2 switch 201 is connected to PC1, PC2 and PC3 via the second Layer 2 switch 202. Therefore, the MAC address table contains MAC1, MAC2 and MAC3, in association with port A (221).

Since port B of the first Layer 2 switch 201 is connected to PC4, the MAC address table contains MAC4, in association with port B (222). Since port C is connected to PC5, the MAC address table contains MAC5, in association with port C (223).

The MAC address tables are automatically generated when the computers are connected to the respective ports. By allowing the computer to transmit a frame to the port upon initial connection to the port, the MAC address of the computer is obtained. When a different computer is connected to the port, the MAC address of the computer is obtained so that the MAC address is updated accordingly. If another Layer 2 switch is cascaded-connected to a port, the MAC addresses of the computers connected to the ports of the Layer 2 switch in cascade connection are all obtained and contained in the MAC address table.

When a frame is input to a port, the first Layer 2 switch 201 detects the MAC address of the input frame, refers to the MAC address table, transfers the frame to the port corresponding to the destination MAC address and outputs the frame from the output port to which the frame is transferred.

For example, if the destination MAC address of the input frame is one of MAC1-MAC3, the first Layer 2 switch 201 transfers the input frame to port A so as to output the frame from port A. If the destination MAC address of the input frame is MAC4 or MAC5, the first Layer 2 switch 201 transfers the frame to port B or port C and outputs the frame from port B or port C.

Figure 5:
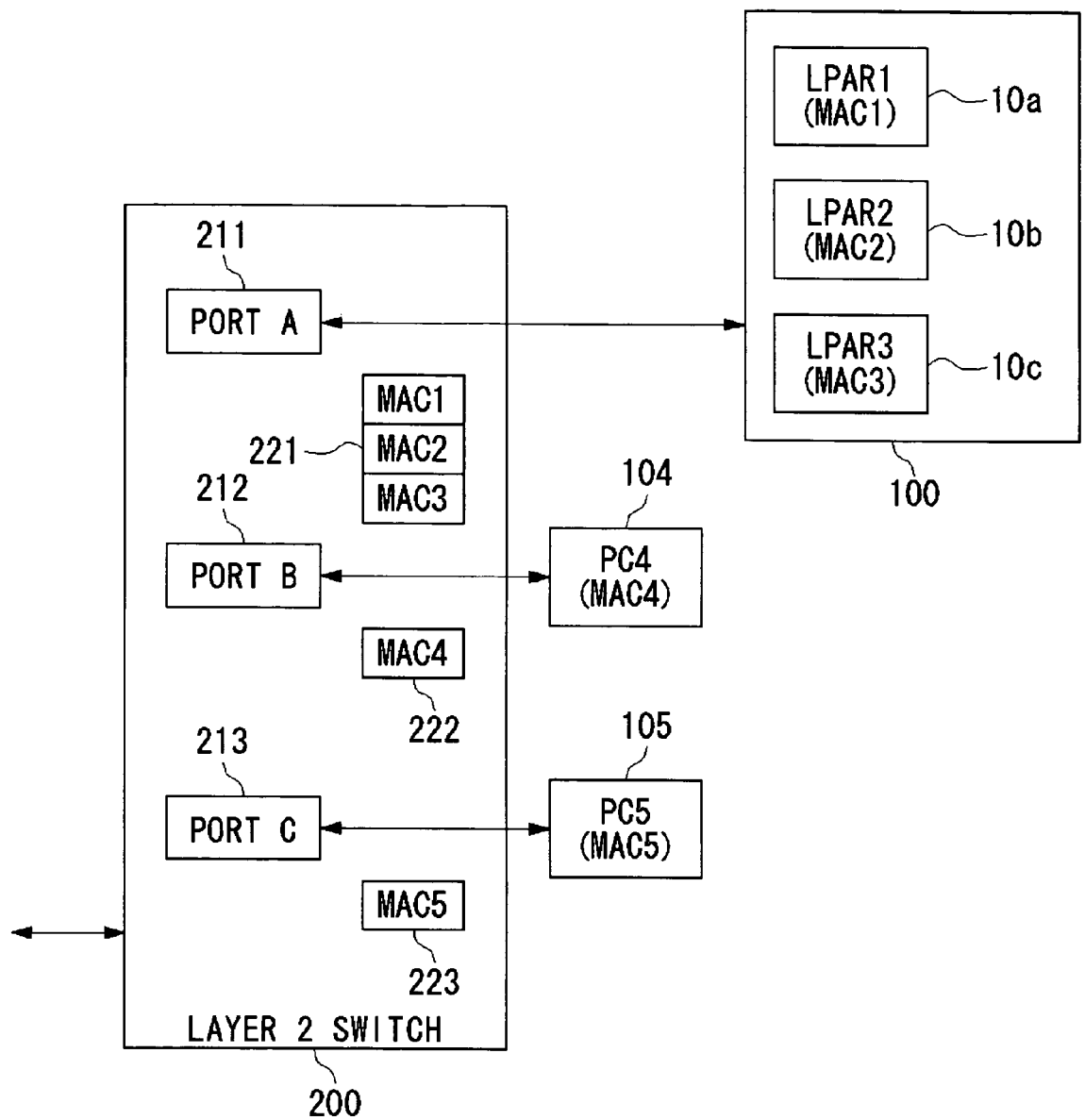
FIG. 5 shows a structure in which the Layer 2 switch of the embodiment is connected to the information processing apparatus.

FIG. 5 shows a structure in which the Layer 2 switch 200 of the embodiment is connected to the information processing apparatus 100.

A difference from the structure of FIG. 4 is that the information processing apparatus 100 including multiple LPARs is connected to port A of the Layer 2 switch 200. It will be assumed here that the information processing apparatus 100 includes three LPARs 10*a*-10*c* ("LPAR1", "LPAR2" and "LPAR3") with the MAC addresses of MAC1, MAC2 and MC3 respectively.

The MAC address table of the Layer 2 switch 200 registers MAC1-MAC3, which are the MAC addresses of LPAR1-LPAR3, in association with port A (221). This may be done manually by the user by manipulating the Layer 2 switch 200 via the driver 40 of the information processing apparatus 100. Alternatively, LPAR1-LPAR3 may transmit a frame to port A so that the MAC addresses of the LPARs are obtained at port A and automatically registered in the MAC address table.

When a frame is input at port A from the information processing apparatus 100, a port controller provided in port A of the Layer 2 switch 200 obtains the destination MAC address of the input frame and refers to the MAC address table so as to obtain the port number ("destination port") associated with the destination MAC address. Since port A is connected to LPAR1-LPAR3, the destination MAC address of the input frame may match one of MAC1-MAC3 associated with port A. In this case, the port controller of port A loops back the input frame to the information processing apparatus 100 unmodified. If the destination MAC address of the input frame is associated with a port other than port A, the port controller of port A transfers the input frame to the destination port.

The port controller provided in port A transmits, to the information processing apparatus 100, the frame transferred to port A from another port, upon determination that the destination MAC address of the transferred frame is one of MAC1-MAC3.

The destination MAC address of a frame input to port B or port C does not designate port B or port C itself, since port B or port C is connected to an ordinary computer. Therefore, a port controller provided in port B and port C refers to the MAC address table according to the ordinary switching function, obtains a port number (i.e. destination port) corresponding to the destination MAC address of the input frame and transfers the input frame to the destination port.

A detailed description of the structure and operation of the port controllers provided in the respective ports will be given later.

Thus, those frames input to port A of the Layer 2 switch 200, for internal communication between one of LPAR1-LPAR3 of the information processing apparatus 100 with another LPAR also within the information processing apparatus 100, are looped back at port A of the Layer 2 switch 200 and received by the destination LPAR of the information processing apparatus 100, using DMA. A frame transmitted from an external device to one of the LPARs within the information processing apparatus 100 is forwarded from port A and received by the destination LPAR of the information processing apparatus 100, as in an ordinary system.

The frame to be transmitted from LPAR1-LPAR3 of the information processing apparatus 100 to an external device is input to port A so that the Layer 2 switch 200 transfers the frame to a port corresponding to the destination MAC address and output the frame via a port to which the frame is transferred. In this way, LPAR1-LPAR3 of the information processing apparatus 100 can communicate with an external device, as in an ordinary system.

Comparing the structure of the ordinary Layer 2 switch 201 of FIG. 4 with the Layer 2 switch 200 of FIG. 5 according to the embodiment, both are provided with MAC address tables for registering MAC addresses in association with respective ports. Thus, the loopback function of FIG. 5 can be implemented by utilizing the structure of the MAC address table of an ordinary Layer 2 switch.

The function of the Layer 2 switch 200 of FIG. 5 is expanded to include the loopback function in addition to the ordinary switching function described with reference to FIG. 4. The port in which the loopback function is turned on is provided with the function of looping back an input frame if the destination MAC address of the frame is associated with this port in the MAC address table.

In an ordinary Layer 2 switch, the MAC address table is only referred to in order to determine the destination of transfer. It is not assumed that its input port receives a frame destined to the port itself. Registered in the MAC address table in association with the ports are the MAC addresses of the terminals connected to the ports, and the terminals never inputs a frame destined to itself to the port, other than for the purpose of testing.

In contrast, the port of the Layer 2 switch 200 according to the embodiment may be connected to the information processing apparatus 100 provided with multiple LPARs. In this case, the MAC address table registers the MAC addresses of the multiple LPARs in association with the port. The port connected with the information processing apparatus 100 is expected to receive a frame having the MAC address of one of the LPARs as a destination MAC address. In this case, the input frame need only be looped back. Accordingly, the Layer 2 switch 200 according to the embodiment can easily be implemented by adding the loopback function to the switching function of an ordinary Layer 2 switch.

Some physical layer (PHY) implementations constituted by ordinary network devices are provided with a loopback function for the purpose of testing. Such a function is provided only for the purpose of testing. Initiating a loopback mode disables communication with an external entity. The conventional implementations do not provide the loopback function as that of the Layer 2 switch 200 according to the embodiment, which performs loopback for internal communication between LPARs as well as achieving communication with an external entity.

A description will now be given of a case where the frame transmitted from the LPARs of the information processing apparatus 100 is a broadcast frame or a multicast frame. If any of the LPARs of the information processing apparatus 100 transmits a broadcast frame or a multicast frame, the frame should be transmitted to the other LPARs within the information processing apparatus 100 as well as to an external device connected to the Layer 2 switch 200, as called for by the definition of broadcast or multicast. A broadcast frame is transmitted to all of the terminals within a network, and a multicast frame, too, is transmitted to all of the designated terminals within a network, although the range of transmission is limited.

The port controllers provided in the ports of the Layer 2 switch 200 exercise control such that, if a frame input to a port in which the loopback function is turned on is a broadcast frame or a multicast frame, the input frame is looped back as well as being transmitted to an external device. The port controller of a port in which the loopback function is turned off need only transmit the input frame to an external device. Loopback is not necessary.

Figure 6:
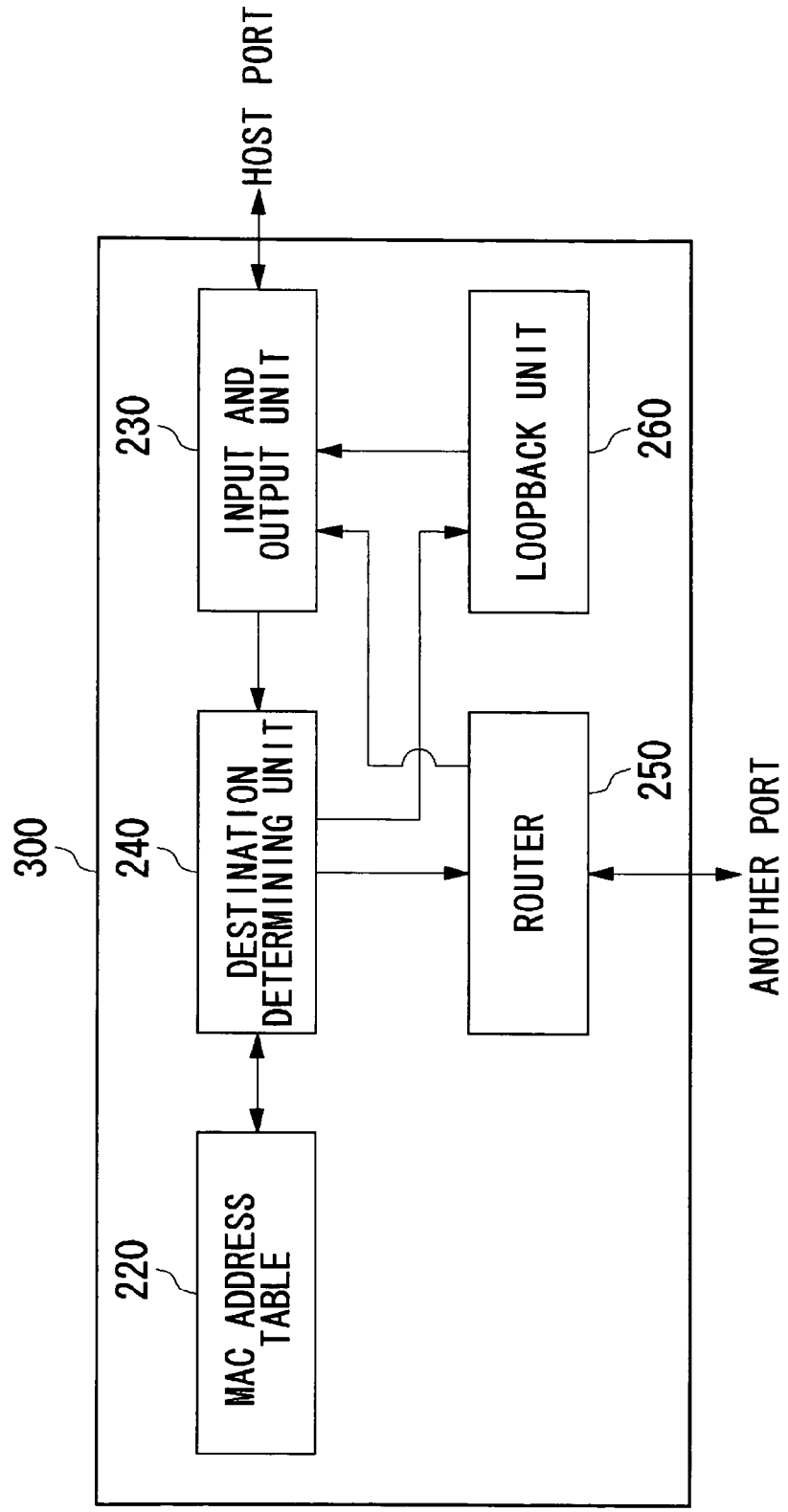
FIG. 6 shows the structure of a port controller provided in the ports of the Layer 2 switch of FIG. 5.

FIG. 6 shows the structure of a port controller 300 provided in each of the ports of the Layer 2 switch 200 of FIG. 5. The port controller 300 is provided with a MAC address table 220, an input and output unit 230, a destination determining unit 240, a router 250 and a loopback unit 260. If the loopback function is turned on in the port, the loopback unit 260 is activated. If the loopback function is turned off, the loopback unit 260 is not activated.

The input and output unit 230 buffers frames input to the host port or frames output from the host port and controls the input and output of the frames that pass through the host port.

The destination determining unit 240 obtains a MAC address from the header of an input frame and obtains a port number (destination port) corresponding to the MAC address by referring to the MAC address table 220.

The MAC address table 220 is a table which stores MAC addresses in association with ports and is referred to by the port controllers 300 of the respective ports. FIG. 6 shows the MAC address table 220 as being located inside the port controller 300 for the purpose of description. In actual implementation, a single MAC address table 220 is provided in the Layer 2 switch 200 and shared by the port controllers 300 of the ports.

FIG. 7 shows an example of the MAC address table 220. Each of the port controllers 300 of the ports obtains the source MAC address from the header of a frame input to the host port and registers, in the MAC addresses 220, the MAC addresses of terminals connected to the host port in association with the host port. Referring to FIG. 5, it will be assumed here that MAC1, MAC2 and MAC3 are stored in association with port A, MAC4 is stored in association with port B and MAC5 is stored in association with port C.

The MAC address table 220 also stores, in association with the ports, information indicating whether the loopback function is turned on or off at the ports. In this example, the loopback function of port A is turned on, and the loopback function of port B and port C is turned off. The loopback function of a port can be manually turned on by the user by manipulating the Layer 2 switch 200 via the driver 40 of the information processing apparatus 100 connected to the port. The Layer2 switch 200 activates the loopback function of the loopback unit 260 only at the port in which the loopback function is turned on in the MAC address table 220.

If the destination determining unit 240 determines that the destination MAC address of an input frame is not registered in the MAC address table 220, it may be because the MAC address table 220 is not set up or the address is not learned yet. The router 250 then transfers the input frame to all ports other than the receiving port. Further, the loopback unit 260 loops back the input frame from the receiving port, if the loopback function of the port is turned on.

If the destination MAC address of the input frame is registered in the MAC address 220, the destination determining unit 240 obtains a port number (destination port) associated with the destination MAC address. If the destination port is a port other than the receiving port, the determining unit 240 communicates the destination port to the router 250, whereupon the router 250 transfers the input frame to the destination port communicated from the destination determining unit 240.

The router 250 provides to the input and output unit 230 a frame transferred from another port, whereupon the input and output unit 230 outputs, from the host port, the frame transferred from the another port.

If the loopback function of the port is turned on, the destination MAC address of the input frame may be associated with the MAC address of the host port in the MAC address table 220. In this case, the destination MAC address is a MAC address to loop back to, and the destination determining unit 240 provides a signal to the loopback unit 260 directing it to loop back the input frame. The loopback unit 260 controls the input and output unit 230 to output from the host port the frame buffered in the host port.

If the input frame is a multicast frame or a broadcast frame, the operation proceeds as follows. If the destination determining unit 240 determines that the destination MAC address of the input frame indicates that the frame is a multicast frame or a broadcast frame, the router 250 transfers the input frame to all ports other than the receiving port, if the loopback function of the port is turned off. If the loopback function of the port is turned on, the router 250 transfers the input frame to all ports other than the receiving port and the loopback unit 260 outputs the input frame from the host port by loopback.

Figure 8:
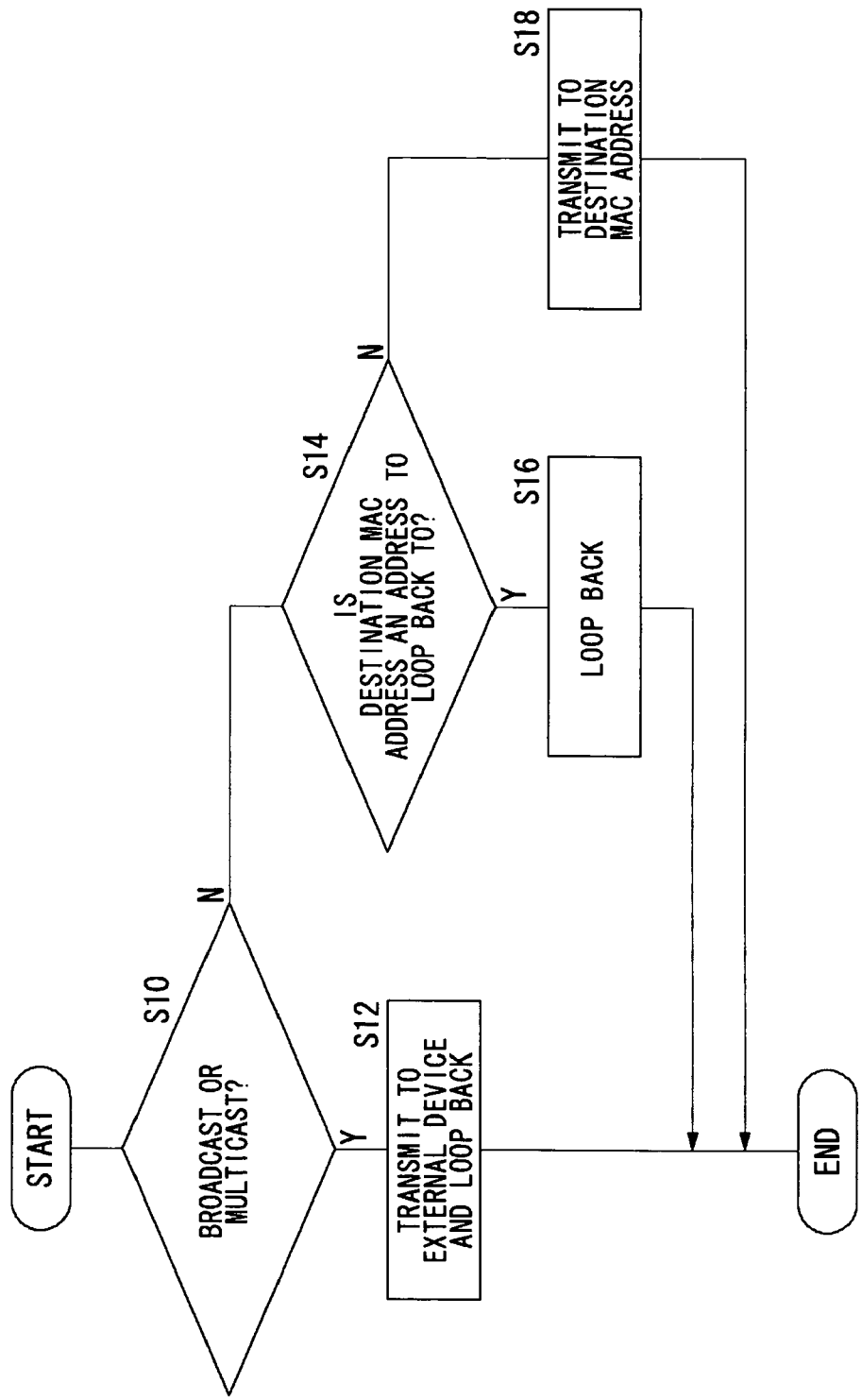
FIG. 8 is a flowchart showing the procedure performed by the port controller of the Layer 2 switch to control frame transfer.

FIG. 8 is a flowchart showing the procedure performed by the port controller 300 of each port of the Layer 2 switch 200 to control frame transfer.

The destination determining unit 240 of the port controller 300 of each port of the Layer 2 switch 200 examines the destination address of a frame input to the port, so as to determine whether the frame is a broadcast frame or a multicast frame (S10). In broadcast or multicast, a special address is specified as a MAC address. Thus, whether a packet is a broadcast packet or a multicast packet can be determined by referring to the destination address contained in the header of the packet.

If the input frame is a broadcast frame or a multicast frame (Y in S10), the router 250 transfers the input frame to all ports other than the receiving port so as to transmit the frame to an external device. In addition, the loopback unit 260 loops back the frame at the port (S12). Loopback is performed only when the loopback function of the port is turned on. In the port in which the loopback function is turned on, the frame is destined to a broadcast address or a multicast address and is also destined to all MAC addresses registered in association with the port in the MAC address table 220.

If the input frame is neither a broadcast frame or a multicast frame (N in S10), the destination determining unit 240 refers to the MAC address table 220 and obtains the port number associated with the destination MAC address of the input frame (i.e. the destination port). The destination determining unit 240 determines whether the destination MAC address is an address to loop back to, depending on whether the destination port is the host port (S14).

If the destination MAC address is an address to loop back to (Y in S14), the loopback unit 260 loops back the input frame unmodified (S16). If the destination MAC address is not an address to loop back to (N in S14), the router 250 transmits the input frame to the destination port (S18). When the MAC address being processed is not registered in the MAC address table 220 (e.g. at initialization), it cannot be determined which port to transmit the input frame to. Therefore, as in S12, the input frame is transmitted to all ports other than the receiving port and, if the loopback function is turned on, the input frame is also looped back at the receiving port.

As described, the information processing system according to the embodiment allows communication between LPARs within the information processing apparatus 100, using existing network functions. The inventive system does not require designing a communication function to exclusively serve LPAR-to-LPAR communication and is favorable because of its ease of implementation. Since memory-to-memory copying does not takes place in a network driver for LPAR-to-LPAR communication and data is exchanged using DMA, high-speed hardware-based communication is enabled without excessively consuming processor resources in the information processing apparatus 100.

The description of the invention given above is based upon one embodiment. The embodiment described is only illustrative in nature and various variations in constituting elements and processes involved are possible. Those skilled in the art would readily appreciate that such variations are also within the scope of the present invention. Some such variations will now be described.

In the embodiment, a single computer system is divided into multiple logical partitions so that operating systems are independently run in the respective logical partitions. The logical partitioning technology may also be applied to a multiprocessor system. By allowing a hypervisor run on one of the processors to assign computing resources such as processors, memories and I/O devices in the multiprocessor system to logical partitions and to control the resources, the multiple logical partitions can be viewed as virtual computers. In this case, the processors in the multiprocessor system may be assigned to respective logical partitions on a one-to-one basis. Alternatively, the resources of a single processor may be assigned to multiple logical partitions by time-division switching. In the latter case, a larger number of logical partitions than the number of physical processors in the multiprocessor system may be generated for execution. Alternatively, the inventive logical partitioning technology may also be applied to an information processing apparatus provided with a multi-core processor in which multiple processor units are packaged by integration in a single chip.

In the described embodiment, the LPARs within the information processing apparatus 100 are capable of communicating with an external device. Instead, one of the LPARs within the information processing apparatus 100 may communicate with an external device on behalf of the other LPARs. If any of the other LPARs is to communicate with an external device, the representative LPAR may route data for transmission and reception from and to an external device. In such an arrangement, communication data is forwarded between the representative LPAR and the other LPARs. For forwarding, communication control such as that of the embodiment described above may be exercised, using the loopback function of the Layer 2 switch 200.

Described above is a communication control method in which internal communication between the LPARs within the information processing apparatus 100 is performed via the Layer 2 switch 200, which is capable of using the loopback function as well as the ordinary switching function. Alternatively, by adding the loopback function to Ethernet MAC or adding the loopback function to the physical layer of the network, similar communication can be achieved using Ethernet MAC or the physical layer. Although a loopback function is provided in Ethernet MAC and the physical layer for the purpose of testing, such a loopback function is provided in a test mode only and is not configured to allow communication with an external device while also allowing loopback to be performed. Therefore, in order to practice the invention, it is necessary to modify the specifications of Ethernet MAC or the physical layer, which is not a practical approach. For implementation, it is more practical and favorable to expand the ordinary switching function of the Layer 2 switch 200 so as to enable loopback, as in the embodiment.

In the description given above, the port controller 300 of the Layer 2 switch 200 detects the destination MAC address of a frame input to the port so as to determine whether the frame should be looped back. Depending on the use, the source MAC address of the input frame may be detected so as to determine whether to loop back.

What is claimed is:

1. An information processing apparatus provided with a plurality of logical partitions assigned logically divided computing resources, and configured such that operating systems are independently run in the respective logical partitions, comprising:

a network driver which receives a request for communication from the logical partitions assigned respective physical addresses and controls transmission and reception of data, wherein the network driver uses DMA to transmit a frame received from one logical partition to a routing apparatus regardless of whether the frame is destined to another logical partition within the information processing apparatus or to an external device other than the information processing apparatus, while the routing apparatus determines a destination of the frame based on destination address thereof and loops back the frame to the network driver if the frame is destined to another logical partition so that an interrupt is signaled to the network driver and the frame is transferred to the network driver using DMA, and the network driver delivers the frame received from the routing apparatus in loopback mode to another logical partition according to the destination address of the frame received from the routing apparatus.

2. The information processing apparatus according to claim 1,
wherein the network driver receives, from one logical partition, data to be delivered from the one logical partition to another logical partition, in the form of a transmission frame destined to a physical address of the another logical partition, and transmits the received frame to the routing apparatus, and
wherein the network driver delivers the data to the another logical partition by receiving as a received frame the data looped back from the routing apparatus.

3. The information processing apparatus according to claim 1, wherein the network driver transfers a frame, received from the one logical partition, from a memory space referred to by the one logical partition to the routing apparatus using DMA, and transfers the frame looped back from the routing apparatus to a memory space referred to by the another logical partition.

4. The information processing apparatus according to claim 2, wherein the network driver transfers a frame, received from the one logical partition, from a memory space referred to by the one logical partition to the routing apparatus using DMA, and transfers the frame looped back from the routing apparatus to a memory space referred to by the another logical partition.

5. The information processing apparatus according to claim 1, wherein the routing apparatus comprising:
an address table which stores a physical address to loop back to, in association with a communication port connected to the information processing apparatus; and
a port controller which, when a destination address of a frame input from the information processing apparatus to the communication port matches the physical address to loop back to stored in the address table, loops back the input frame to the information processing apparatus.

6. The information processing apparatus according to claim 5,
wherein the information processing apparatus provided with a plurality of logical partitions which are assigned logically divided computing resources and are assigned respective physical addresses,
wherein the address table stores, as the physical address to loop back to, the physical addresses of the logical partitions in the information processing apparatus, and when a frame packet destined from one logical partition to another logical partition is input to the communication port, the port controller loops back the input frame to the another logical partition, determining that a destination address of the input address matches the physical address to loop back to stored in the address table.

7. The information processing apparatus according to claim 6, wherein, if the frame input from the information processing apparatus to the communication port is a broadcast frame or a multicast frame, the port controller outputs the input frame to ports other than the receiving port and also loops back the input frame to the information processing apparatus connected to the receiving communication port.

8. A computer-readable storing medium encoded an executable program that, when executed, causes a processor to control a network driver in an information processing apparatus provided with a plurality of logical partitions assigned logically divided computing resources, and configured such that operating systems are independently run in the respective logical partitions, the executable program comprising:
a transmission and reception control module which receives a request for communication from the logical partitions assigned respective physical addresses and controls transmission and reception of data; and
a delivering module which uses DMA to transmit a frame received from one logical partition to a routing apparatus regardless of whether the frame is destined to another logical partition within the information processing apparatus or to an external device other than the information processing apparatus, while the routing apparatus determining a destination of the frame based on destination address thereof and looping back the frame to the network driver if the frame is destined to another logical partition so that an interrupt is signaled to the network driver and the frame is transferred to the network driver using DMA, and which delivers the frame received from the routing apparatus in loopback mode to another logical partition according to the destination address of the frame received from the routing apparatus.

9. An information processing system including an information processing apparatus which is with a plurality of logical partitions assigned logically divided computing resources, and which is configured such that operating systems are independently run in the respective logical partitions, and also including a routing apparatus which is connected to the information processing apparatus, the information processing apparatus comprising:
a network driver which receives a request for communication from the logical partitions assigned respective physical addresses and controls transmission and reception of data,
wherein the routing apparatus includes a port controller which loops back a frame, input from the information processing apparatus to a communication port, to the information processing apparatus, and the network driver uses DMA to transmit a frame received from one logical partition to the routing apparatus regardless of whether the frame is destined to another logical partition within the information processing apparatus or to an external device other than the information processing apparatus, while the routing apparatus determines a destination of the frame based on destination address thereof and loops back the frame to the network driver if the frame is destined to another logical partition so that an interrupt is signaled to the network driver and the frame is transferred to the network driver using DMA, and the network driver delivers the frame received from the routing apparatus in loopback mode to another logical partition according to the destination address of the frame received from the routing apparatus.

10. A method for controlling communication between logical partitions assigned logically divided computing resources and assigned respective physical addresses, comprising:
using DMA to transfer a frame, received from one logical partition, from a memory space referred to by the one logical partition to a routing apparatus regardless of whether the frame is destined to another logical partition within the information processing apparatus or to an external device other than the information processing apparatus, while the routing apparatus determining a destination of the frame based on destination address thereof and looping back the frame to the network driver if the frame is destined to another logical partition so that an interrupt is signaled to the network driver and the frame is transferred to the network driver using DMA; and
transferring the frame looped back from the routing apparatus to a memory space referred to by another logical partition in accordance with the destination address of the frame received from the routing apparatus.

* * * * *